United States Patent

Gonidec et al.

[11] Patent Number: 5,899,059
[45] Date of Patent: May 4, 1999

[54] PIVOTING DOOR THRUST REVERSER WITH TRANSLATABLE AUXILIARY PANEL

[75] Inventors: Patrick Gonidec, Montivilliers; Gérard Rouyer Pascal, Saint Aubin Routot; Bernard Vauchel Guy, Le Havre, all of France

[73] Assignee: Société Hispano-Suiza, Paris, France

[21] Appl. No.: 08/856,146

[22] Filed: May 14, 1997

[30] Foreign Application Priority Data

May 15, 1996 [FR] France .................................. 96 06046

[51] Int. Cl.⁶ ....................................................... F02K 1/00
[52] U.S. Cl. ..................... 60/230; 60/226.2; 239/265.37; 244/110 B
[58] Field of Search .................................. 60/226.2, 262, 60/230; 239/265.33, 265.37; 244/110 B

[56] References Cited

U.S. PATENT DOCUMENTS

| | | |
|---|---|---|
| 3,279,182 | 10/1966 | Helimintoller . |
| 3,598,318 | 8/1971 | Schiel . |
| 3,601,992 | 8/1971 | Maison . |
| 3,605,411 | 9/1971 | Maison et al. . |
| 3,739,582 | 6/1973 | Maison ................................... 60/226.2 |
| 3,831,376 | 8/1974 | Moorehead . |
| 4,894,985 | 1/1990 | Dubois et al. . |
| 5,039,171 | 8/1991 | Lore . |
| 5,297,387 | 3/1994 | Carimali et al. . |
| 5,782,434 | 7/1998 | Jean ..................................... 239/265.37 |
| 5,806,302 | 9/1998 | Cariola et al. .......................... 60/226.2 |

FOREIGN PATENT DOCUMENTS

| | | |
|---|---|---|
| 0 413 635 | 2/1991 | European Pat. Off. . |
| 1.482.538 | 5/1967 | France . |
| 2.030.034 | 10/1970 | France . |
| 2 618 853 | 2/1989 | France . |
| 2 680 547 | 2/1993 | France . |

*Primary Examiner*—Charles G. Freay
*Attorney, Agent, or Firm*—Bacon & Thomas, PLLC

[57] ABSTRACT

A thrust reverser is disclosed for a turbojet engine having a cowling forming an outer boundary for a gas flow duct, the cowling having at least one reverse thrust opening communicating with the gas flow duct. The thrust reverser includes a thrust reverser door pivotally attached to the cowling so as to move between a forward thrust position, in which the reverse thrust opening is uncovered and the thrust reverser door covers the reverse thrust opening, and a reverse thrust position in which the thrust reverser door directs at least a portion of the gas flow from the duct through the reverse thrust opening. A panel is incorporated into the thrust reverser such that it is movable between a first position in which an inner surface of the panel forms a portion of the outer boundary of the gas flow duct and a second position wherein the entire panel is located within the gas flow duct. An actuating mechanism is connected to the panel to move it between its first and second positions such that the panel undergoes generally translational movement.

16 Claims, 10 Drawing Sheets

PIVOTING DOOR THRUST REVERSER WITH TRANSLATABLE AUXILIARY PANEL

BACKGROUND OF THE INVENTION

The present invention relates to a pivoting door thrust reverser for a turbojet engine, more particularly a thrust reverser having panels mounted on the engine cowling and cooperating with the pivoting thrust reverser door.

Turbofan-type turbojet engines are well known in the art and typically comprise a fan at the front of the turbojet engine which directs a flow of bypass air through a duct bounded on the inside by the engine cowling and on the outside by a fan cowling. The generally annular duct bounded by the engine cowling and the fan cowling may channel both the bypass flow and the primary exhaust gas flow at a downstream portion or may channel only the bypass flow.

In aircraft on which the turbojet engine is mounted outside of the airframe structure, the fan cowling and the engine cowling are configured to form boundaries of the bypass flow duct and to provide aerodynamic outer surfaces to reduce drag.

Figure 1:
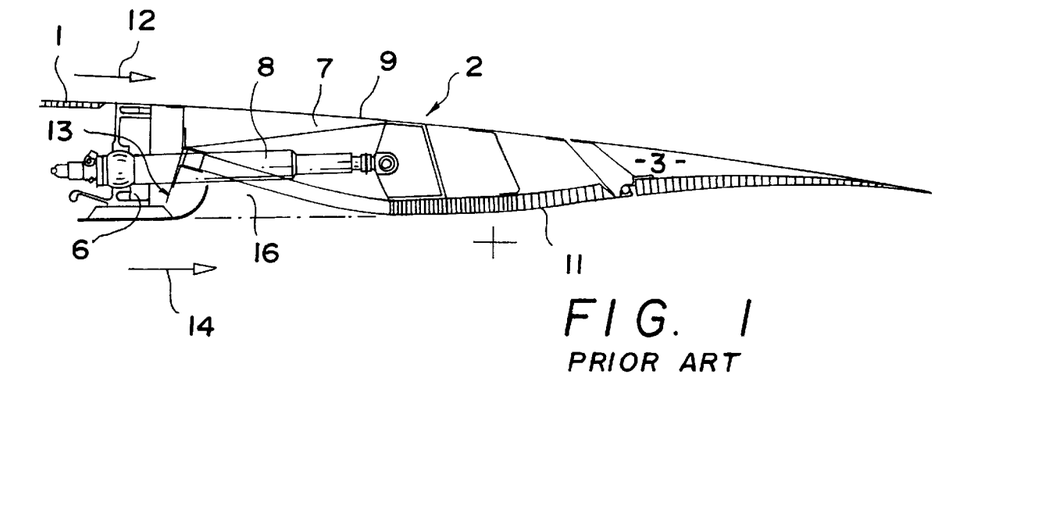
FIG. 1 is a partial, longitudinal, cross-sectional view illustrating a known type of pivoting door thrust reverser with the thrust reverser door in the forward thrust position.
Figure 2:
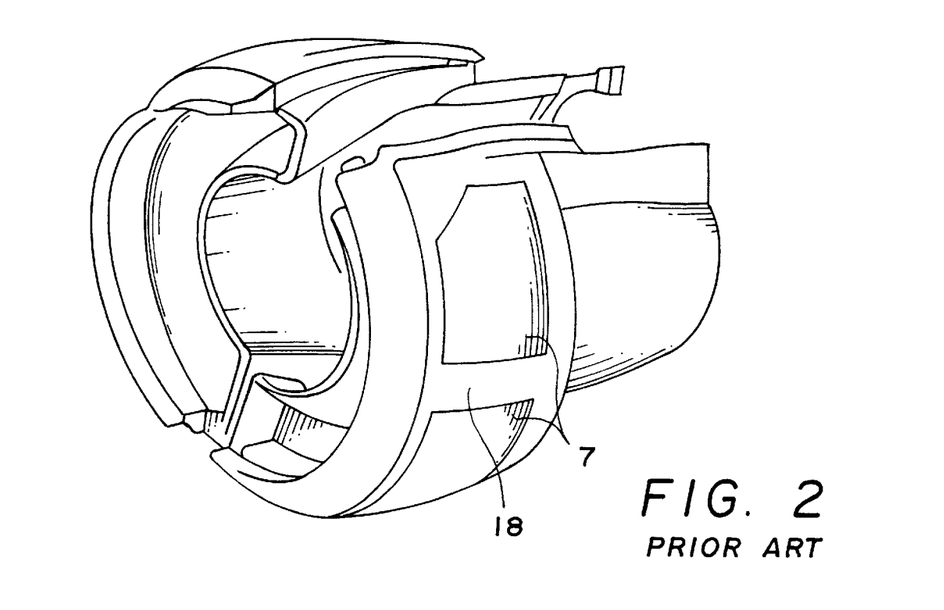
FIG. 2 is a schematic view of a cowling incorporating the known thrust reverser illustrated in FIG. 1 with the thrust reverser doors in their forward thrust positions.

FIGS. 1 and 2 illustrate a known pivoting door-type thrust reverser associated with the fan cowling of a turbofan-type turbojet engine. As illustrated in FIG. 1, the upstream portion of the fan cowling which defines the outer limits of the bypass flow duct and which is generally concentrically arranged about the turbojet engine (not shown) is designated as 1 and generally comprises an external cowling panel and an internal cowling panel interconnected by a frame 6. The outer surface of the external cowling panel has an aerodynamic surface over which the air external to the engine passes during aircraft flight in the direction of arrow 12. The inner surface of the inner cowling panel defines the outer boundary of the bypass flow duct through which the bypass air flow passes in the direction of arrow 14.

The fan cowling also comprises a trust reverser, illustrated generally at 2, and a downstream fairing 3. The thrust reverser 2 comprises a door 7 pivotally attached to the cowling such that it is movable between a closed, forward thrust position, illustrated in FIG. 1, and an open, reverse thrust position in which the upstream end (towards the left as viewed in FIG. 1) of the thrust reverser door 7 is moved outwardly from the cowling, while a downstream portion is moved inwardly into the bypass flow duct airstream so as to redirect at least a portion of the bypass flow through an opening in the fan cowling in a direction that has a reverse thrust component.

An actuator 8 for moving the door 7 between its forward thrust and reverse thrust positions may comprise a hydraulic cylinder mounted to the frame 6, and having an extendible and retractable piston rod connected to the thrust reverser door 7.

The thrust reverser door 7 has an outer door panel 9 and an inner door panel 11 joined together by an internal structure. The upstream end of the door 7 may have a deflector 13 to maximize the efficiency of the thrust reverser when the door 7 is in the reverse thrust position. When the door is in the forward thrust position, as illustrated in FIG. 1, the outer door panel 9 is substantially flush with the external surfaces of the upstream panel and the downstream fairing 3.

As illustrated in FIG. 2, a plurality of thrust reverser doors 7 may be incorporated into the fan cowling, such doors being circumferentially spaced around the periphery of the fan cowling. A portion 18 of the fan cowling extends from an upstream portion 4 of the cowling axially between adjacent thrust reverser doors 7 to provide structural rigidity to the fan cowling and to provide pivot mounting points for attaching the doors 7 to the fan cowling. French Patents 1,482,538 and 2,030,034 illustrate typical, known thrust reversers.

U.S. Pat. No. 3,605,411 discloses a pivoting door-type thrust reverser in which the deflector mounted on the upstream or forward end of the thrust reverser door is movable to an extended position when the door is in the reverse thrust position.

French Patent 2,618,853 discloses a thrust reverser in which the deflector is retracted when the door is in its forward thrust position to optimize engine performance.

In some applications, as illustrated in FIG. 1, the deflector 13 projects from the inner panel 11 of the thrust reverser door 7 even when the door is in its forward thrust position without extending into the bypass flow duct. This forms a cavity 16 facing inwardly into the bypass flow duct which will slightly degrade engine performance.

French Patent 2,680,547 discloses a thrust reverser having a combination of spoilers and deflectors to attempt to optimize the direction of exhaust flow.

The above-described known thrust reversers incur major drawbacks because of the aerodynamic size constraints on the flow passage cleared by the forward portion of the thrust reverser door which cause the door to be biased in the open, thrust reversing direction. The full cross-section of the flow passage must be larger than the associated duct cross-section in a plane taken upstream, or forward, of the door on account of the pressure losses due to the gas flow deflection since the downstream, or rearward portion of the duct unobstructed by the inwardly protruding portion of the thrust reverser door is minimized in order to produce an appropriate reverse thrust force.

Quite obviously, the bias of the doors toward the open or reverse thrust position is a safety drawback. The reverser would be safer if the thrust reverser door was biased towards the closed or forward thrust position. This consideration also applies to a thrust reverser door that would tend to close again under pressure even if it was partially deployed towards the thrust reversing position.

In some cases, the effect of the pressure acting on the thrust reverser door is such that very high stresses are transmitted through the thrust reverser door actuators between their attachment points to the upstream portion of the cowling and the doors. As a consequence, this structure and the door locking mechanisms must be undesirably heavy.

European Patent Application 0 413 635 discloses a thrust reverser with doors associated with an upstream panel having stationary pivots about which the panels move. The panel is moved by the associated thrust reverser door using connecting rods, in the same direction of rotation as the door. In this design, the panel acts as a shield against the flow of the reverse thrust gases contacting the thrust reverser door when the door and the panel are in their reverse thrust positions, making it impossible to achieve optimal guidance of the reverse flow gases.

SUMMARY OF THE INVENTION

A thrust reverser is disclosed for a turbojet engine having a cowling forming an outer boundary for a gas flow duct, the cowling having at least one reverse thrust opening communicating with the gas flow duct. The thrust reverser includes a thrust reverser door pivotally attached to the cowling so as to move between a forward thrust position, in which the reverse thrust opening is uncovered and the thrust reverser door covers the reverse thrust opening, and a reverse thrust position in which the thrust reverser door directs at least a portion of the gas flow from the duct through the reverse thrust opening. A panel is incorporated into the thrust reverser such that it is movable between a first position in which an inner surface of the panel forms a portion of the outer boundary of the gas flow duct and a second position wherein the entire panel is located within the gas flow duct. An actuating mechanism is connected to the panel to move it between its first and second positions such that the panel undergoes generally translational movement.

The thrust reverser has increased safety over the known thrust reversers insofar as the pressure of the gases in the gas flow duct act on the inner surface of the panel when it is in its first position urging the panel towards the thrust reverser door. Linkage connecting the panel to the door will transfer this force to the thrust reverser door so as to urge the door toward its forward thrust position. This prevents inadvertent deployment of the thrust reverser door from its forward thrust position. This feature also enables the thrust reverser structure to be lighter in weight than the known systems, since the forces acting on the door are less than in the known systems.

BRIEF DESCRIPTION OF THE DRAWINGS

FIG. 24 is a view similar to FIG. 13, but illustrating the thrust reverser door in the reverse thrust position.

DETAILED DESCRIPTION OF THE PREFERRED EMBODIMENTS

Figure 3:
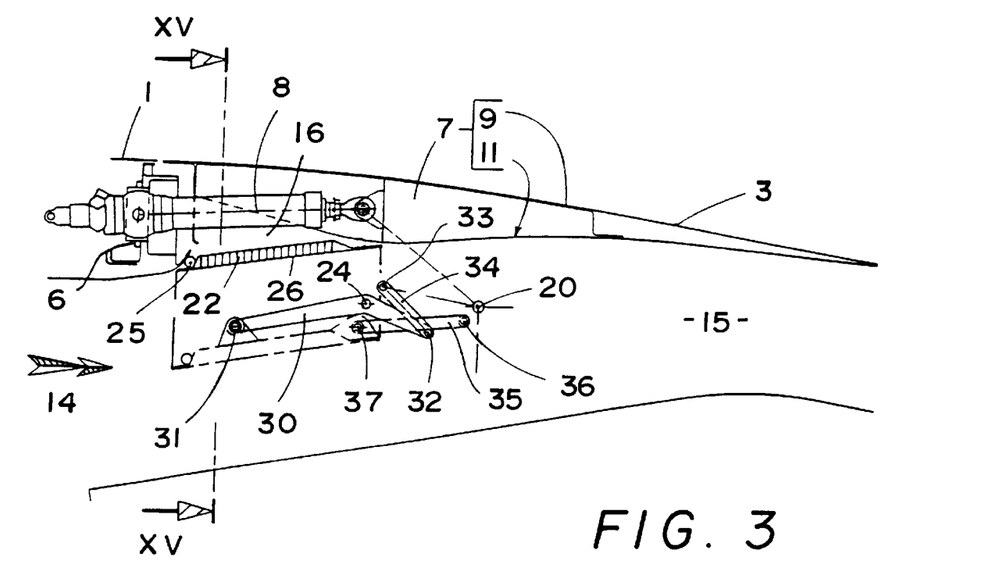
FIG. 3 is a partial, longitudinal, cross-sectional view of a first embodiment of the thrust reverser according to the present invention with the thrust reverser door in the forward thrust position.

In the descriptions of the embodiments of the present invention, the elements having similar structural characteristics and/or functions of the prior art illustrated in FIGS. 1 and 2 have been assigned the identifying numerals. In particular, the trust reverser is associated with a cowling 1 having an upstream structure and a thrust reverser door 7 located between the cowling 1 and the downstream fairing 3, wherein the thrust reverser door has an outer surface 9 and an inner surface 11. The door 7 is moved between its forward and reverse thrust positions by door actuator 8 attached to the internal cowling structure 6. The gases in the gas flow duct 15 move in the direction of arrow 14 as illustrated in FIG. 3.

Panel 22 has an inner surface 26 forming a portion of the outer boundary of the gas flow duct 15 when it is in a position covering the cavity 16 to form a smooth outer boundary of the duct between the inner surface 11 of the thrust reverser door 7 and the inner surface of the cowling 1. This maximizes the efficiency of the gas flow when the elements are in their forward thrust positions, as illustrated in FIG. 3. Seals 25 are interposed between the panel 22 and the cowling 1, as well as between the panel 22 and the inner surface 11 of the thrust reverser door 7 to prevent gases in the duct 15 from entering the cavity 16. Seals 25 may either be affixed to the panel 22, or may be affixed to the cowling and the door so as to bear against the panel 22.

In this particular embodiment, the panel 22 is connected to the thrust reverser door 7 by an actuating linkage mechanism comprising a first link rod 30 pivotally attached to the cowling at pivot point 24 and to the panel 22 by pivot 31. The linkage mechanism also includes a second link rod 35 pivotally connected to the cowling at pivot point 36 and to the rear, or downstream, portion of the panel 22 at pivot 37. Pivot points 24 and 36 are spaced apart from each other and are both located between the door pivot axis 20 and a front edge of the thrust reverser opening bounded by the rearmost portion of cowling 1. Pivot points 24 and 36 are both located on opposite sides of the arcuate shaped panel 22 and are typically attached to the longitudinal portions 18 of the cowling. Pivots 31 and 37 are located on the panel 22 between its forward and rearward edges. Obviously, the locations of the respective pivots may be altered depending upon the desired characteristics of the panel movement for each specific usage of the thrust reverser. The two link rods, the cowling and the panel form a four bar link which enables the panel to move between its first position, illustrated in FIG. 3, and its second position, illustrated in FIG. 4, wherein the entire panel 22 is located in the gas flow duct 15 by generally translational movement undergoing no rotation.

Figure 4:
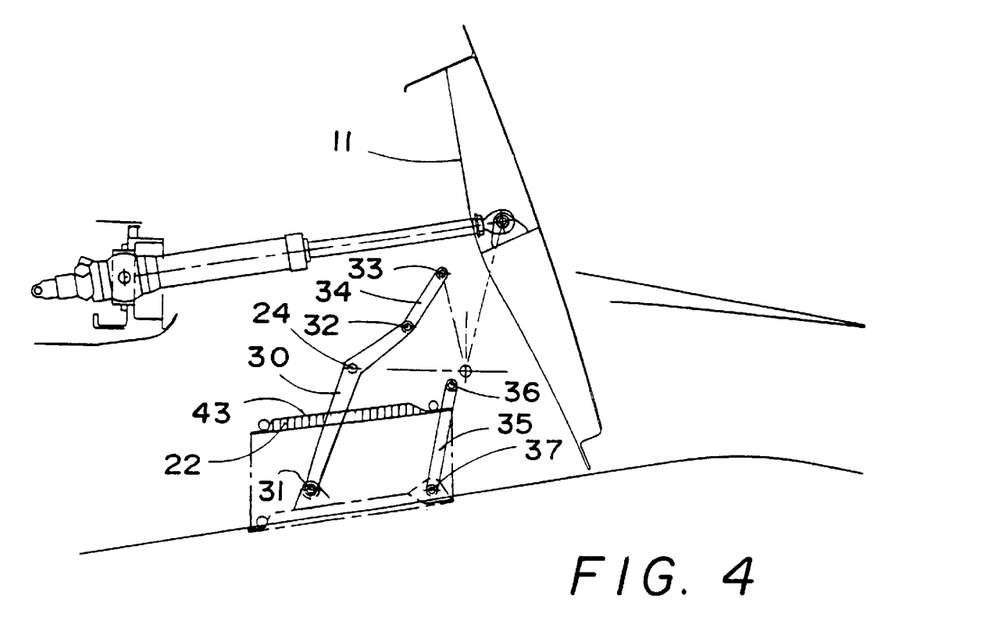
FIG. 4 is a view similar to FIG. 3 illustrating the thrust reverser door in the reverse thrust position.

An end of first link rod 30 is connected to third link rod 34 by pivot 32 and the opposite end of link rod 34 is pivotally connected to the thrust reverser door at pivot 33. As best illustrated in FIG. 4, it can be seen that, as the thrust reverser door 7 pivots about door pivot axis 20, movement of link rod 34 will cause link rod 30 to pivot about its pivot attachment 24, which pivoting movement will also cause link rod 35 to pivot about its pivot point 36. This movement causes the panel 22 to translate away from the cowling into the gas flow duct. The orientation of the panel 22 may be substantially parallel to the gas flow flowing through the duct 15, thereby enabling the pressure of the gas to act on inner surface 26 when the panel is in the first position thereby urging the panel outwardly towards the thrust reverser door 7. Such urging force will be translated by the linkage mechanism to the thrust reverser door 7 and will, in turn, urge the door toward its forward thrust position.

The desired orientation of the panel 22 when in its second position (illustrated in FIG. 4) will depend upon the positions of pivot points 24 and 36, the positions of the pivots 31 and 37, the lengths of the link rods 30, 34 and 35, and on the locations of the pivots 32 and 33. The position of the panel 22 may be tailored to provide the desired gas flow for each specific application of the instant thrust reverser.

The linkage mechanism illustrated is located on each lateral side of the arcuate panel 22. It is within the scope of the present invention to provide that the geometry of the linkages on either side be the same, or different, again tailor the characteristics for each specific application. As shown in FIG. 4, the orientation of the panel 22 in its second position may be optimized to provide minimal disturbances in the gas flow during reverse thrust operation, or may be tailored to provide a specific directional input to the reverse thrust gas flow.

Figure 5:
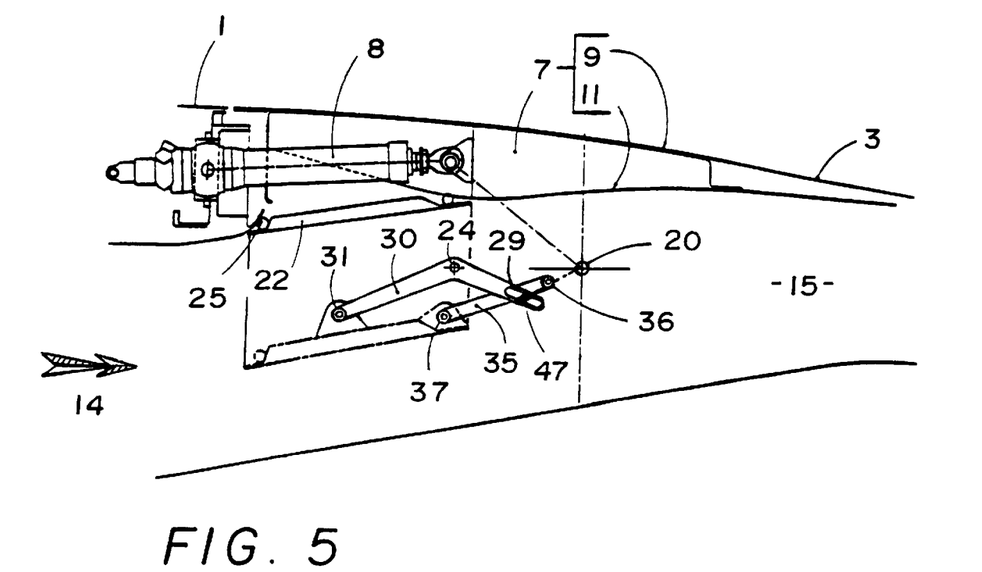
FIG. 5 is a view similar to FIG. 3, illustrating a second embodiment of the thrust reverser according to the present invention with the thrust reverser door in the forward thrust position.
Figure 6:
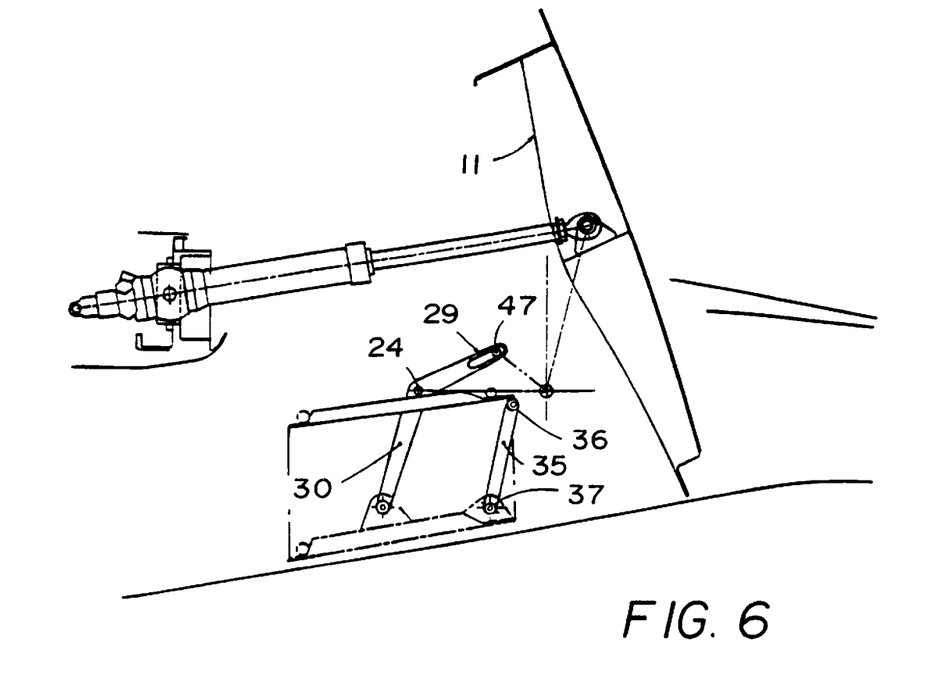
FIG. 6 is a view similar to FIG. 5 illustrating the thrust reverser door in the reverse thrust position.

FIGS. 5 and 6 illustrate a second embodiment of the present invention. Again, in this embodiment, the panel 22 is physically connected to the thrust reverser door 7 such that, as the rust reverser door 7 moves between its forward and reverse thrust positions, panel 22 will be moved between its first and second positions. This embodiment is identical to that previously described, except for the attachment between the first link rod 30 and thrust reverser door 7. In this embodiment, the end of first link rod 30 defines an elongated slot 29 that is engaged by a pin 47 extending from a lateral portion of the thrust reverser door 7. As can be seen, as the door 7 pivots about door pivot axis 20 the engagement of pin 47 with the elongated slot 29 will cause pivoting movement of the link rods 30 and 35 which, in turn, causes substantially translational movement of panel 22.

Figure 7:
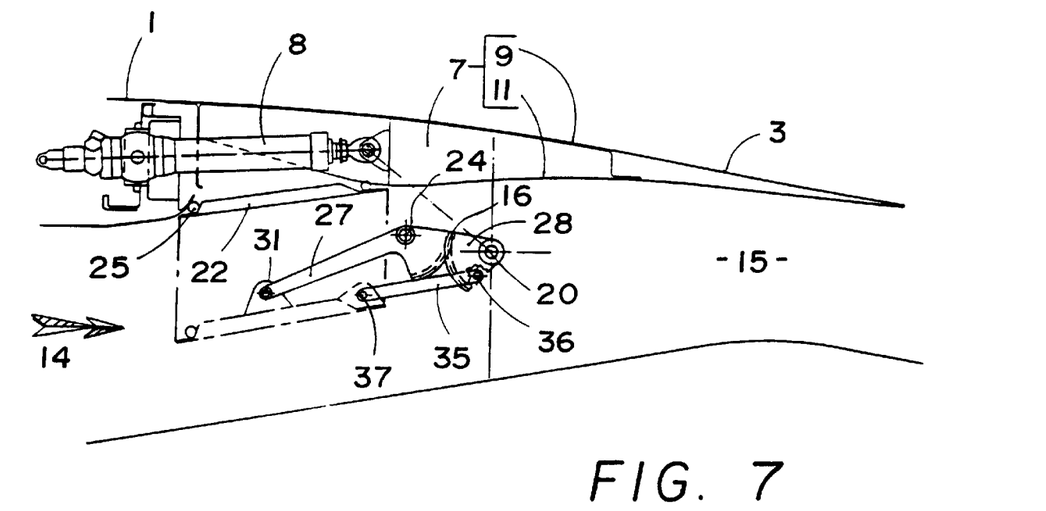
FIG. 7 is a partial, longitudinal, cross-sectional view of a third embodiment of the present invention with the thrust reverser door in the forward thrust position.
Figure 8:
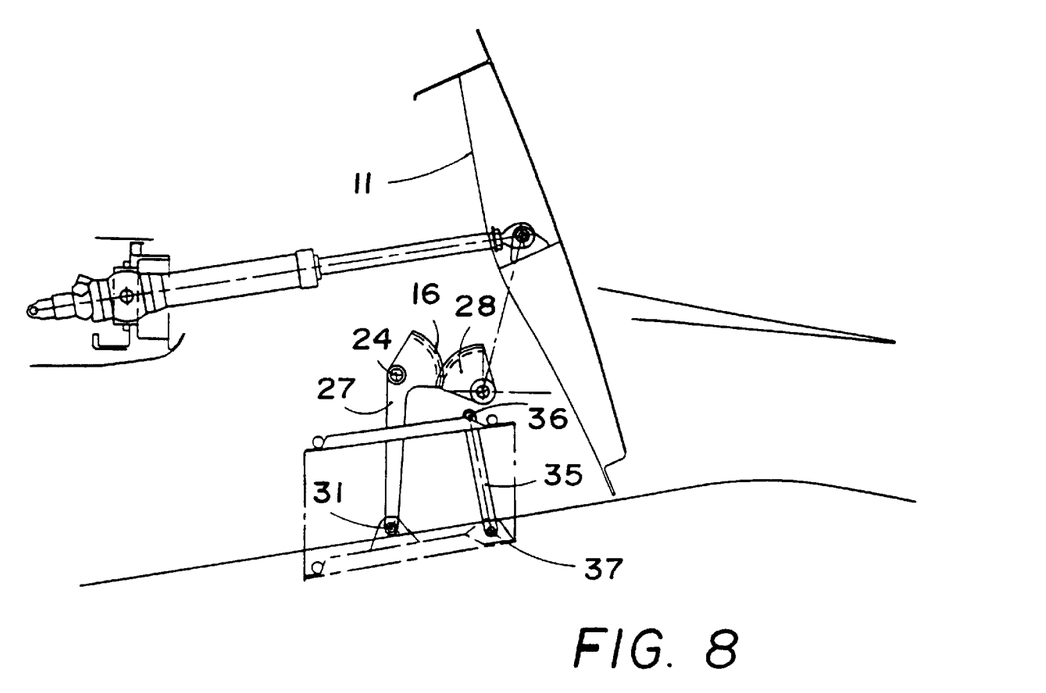
FIG. 8 is a view corresponding to FIG. 7, but illustrating the thrust reverser door in the reverse thrust position.

In the embodiment illustrated in FIGS. 7 and 8, the actuating mechanism comprises a sector gear 16 affixed to, or formed as part of the link rod 27 that is pivotally attached to the cowling at pivot point 24 and pivotally attached to the panel 22 at pivot 31. A second sector gear 28, engaged with the sector gear 16, is fixedly attached to the thrust reverser door 7 so as to pivot about door pivot axis 20. As the door 7 pivots about the pivot axis 20, movement of sector gear 16 and the engagement of the sector gears 28 and 16 causes link rod 27 to pivot about its pivot point 24. Such movement causes pivoting movement of link rod 35 and the substantially translational movement of the panel 22 between the positions illustrated in FIGS. 7 and 8.

Figure 9:
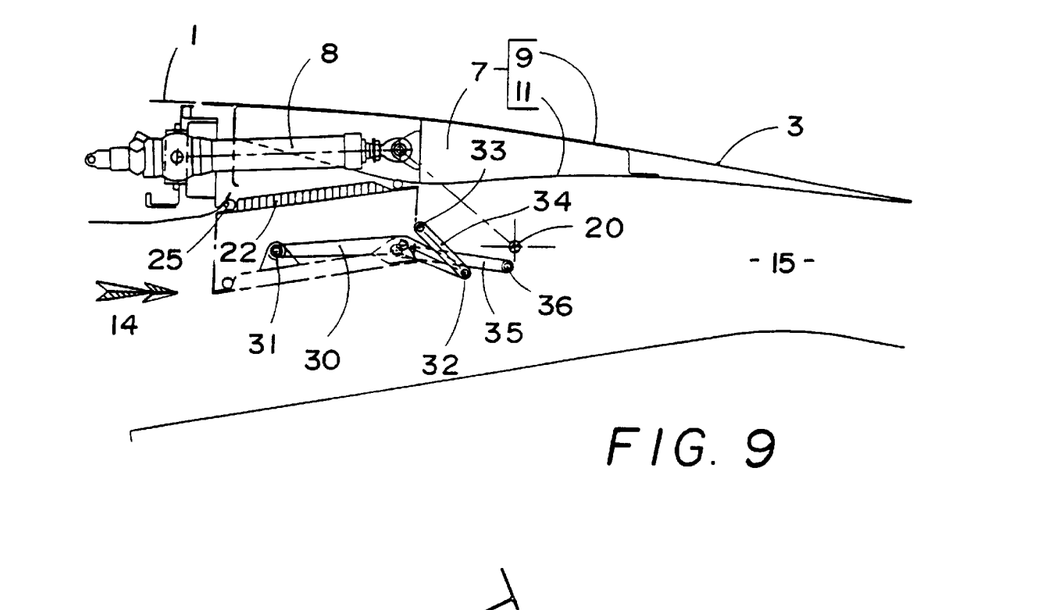
FIG. 9 is a longitudinal, cross-sectional view of a fourth embodiment of the present invention with the thrust reverser door in the forward thrust position.
Figure 10:
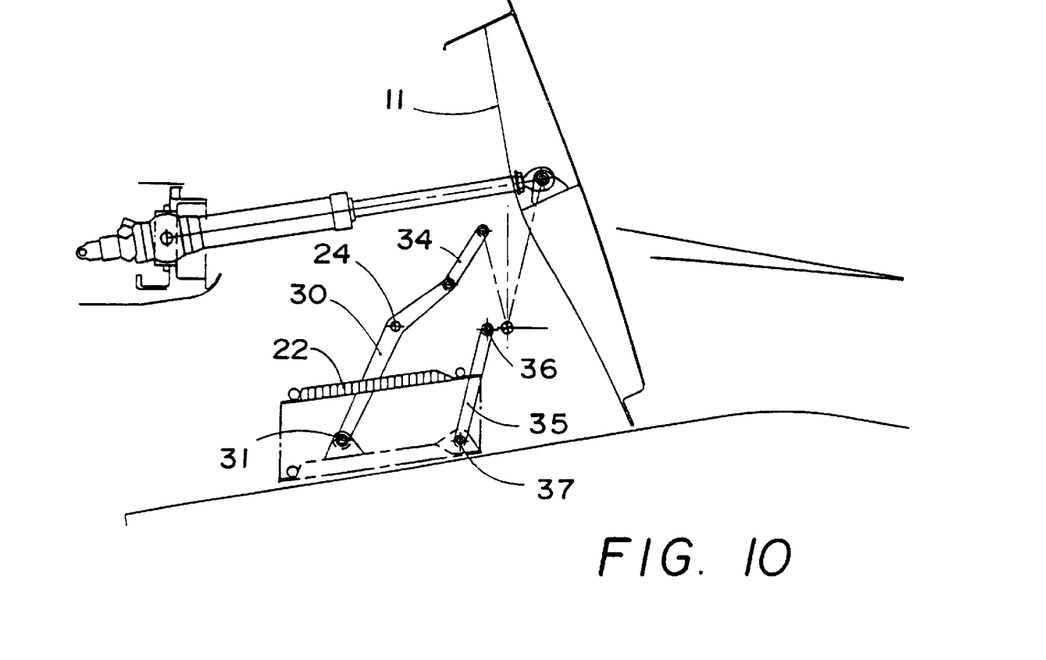
FIG. 10 is a cross-sectional view corresponding to FIG. 9, but illustrating the thrust reverser door in the reverse thrust position.

The embodiment illustrated in FIGS. 9 and 10 differs from the embodiment previously discussed and illustrated in FIGS. 3 and 4 by pivotally attaching the second link rod 35 to the thrust reverser door at pivot point 36. Pivot point 36 will move about door pivot axis 20 as the door 7 moves between its forward and reverse thrust positions to move the panel 22 as illustrated in FIGS. 9 and 10.

Figure 11:
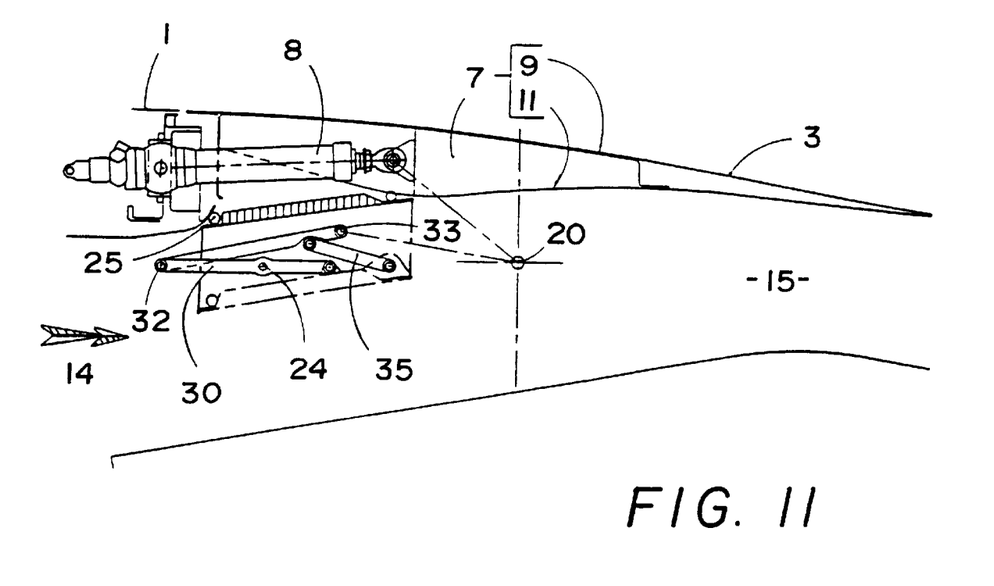
FIG. 11 is a partial, longitudinal, cross-sectional view of a fifth embodiment of the present invention illustrating the thrust reverser door in the forward thrust position.
Figure 12:
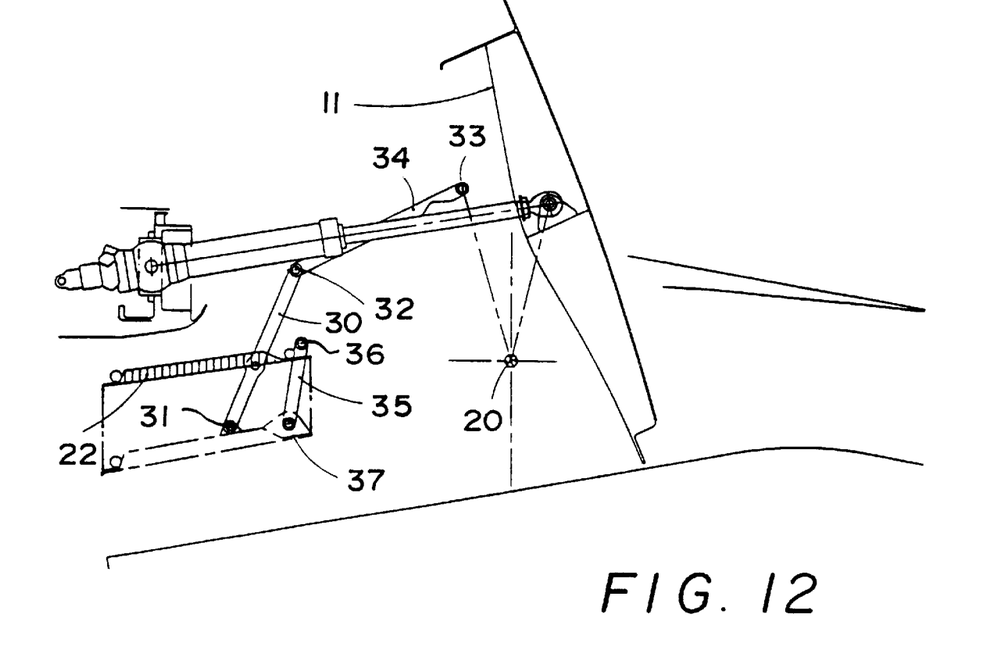
FIG. 12 is a view corresponding to FIG. 11, but illustrating the thrust reverser door in the reverse thrust position.

In the embodiment illustrated in FIGS. 11 and 12, as in the embodiment illustrated in FIGS. 3 and 4, pivot points 24 and 36 are attached to the cowling. The orientation of the link rods 30 and 35 are different from the previously described embodiment and the actuation of the panel 22 is achieved by connecting the link rod 30 to the thrust reverser door 7 by link rod 34. With this link rod configuration, the panel 22 not only is moved inwardly into the gas flow duct 15, but is also moved in a forward direction as it moves from its first position (illustrated in FIG. 11) to its second position (illustrated in FIG. 12).

Figure 13:
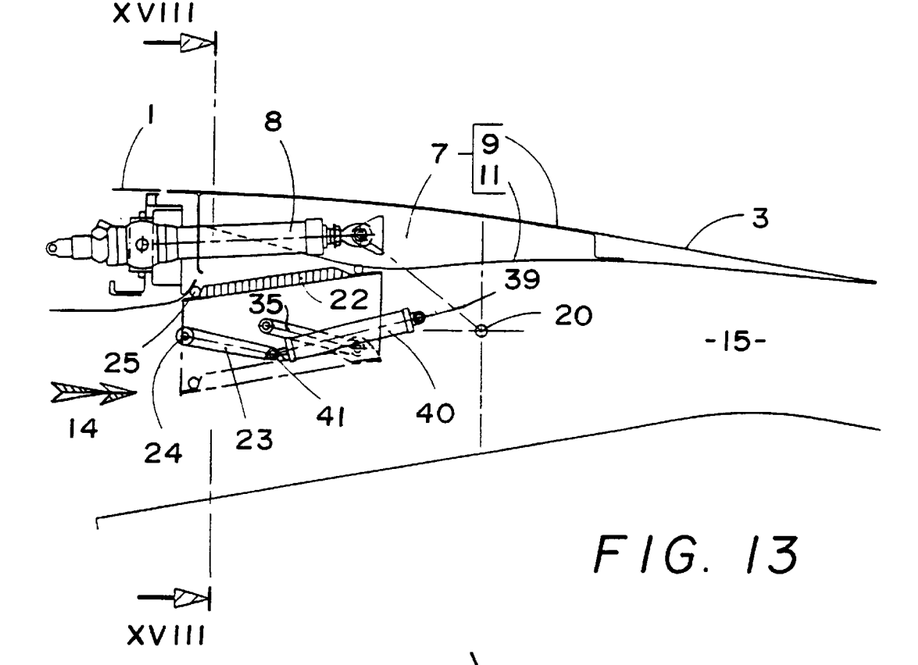
FIG. 13 is a partial, longitudinal, cross-sectional view of a sixth embodiment of the present invention with the thrust reverser door in the forward the thrust position.
Figure 18:
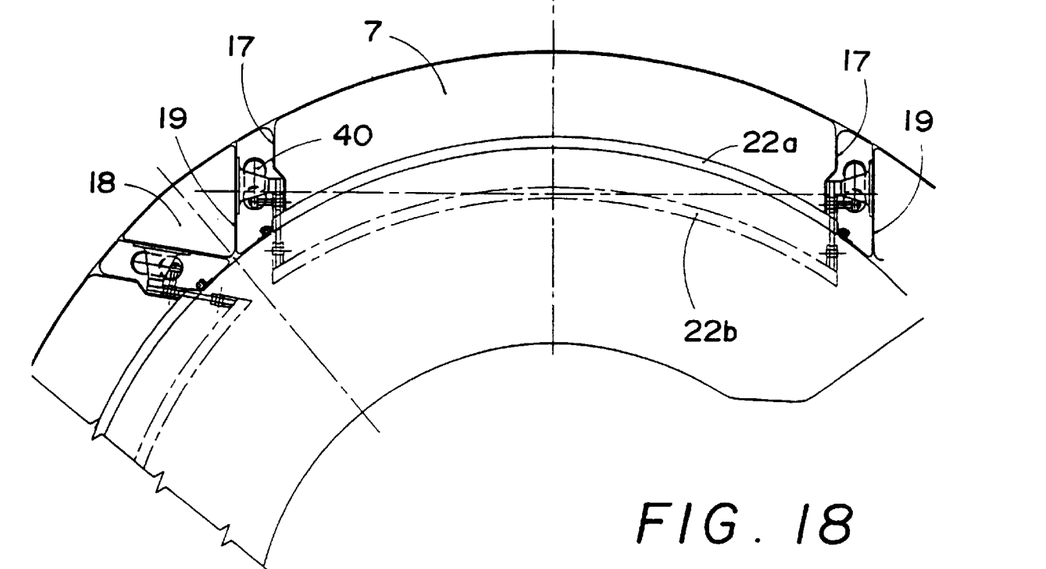
FIG. 18 is a cross-sectional view taken in the direction of arrows XVIII—XVIII in FIG. 13.
Figure 19:
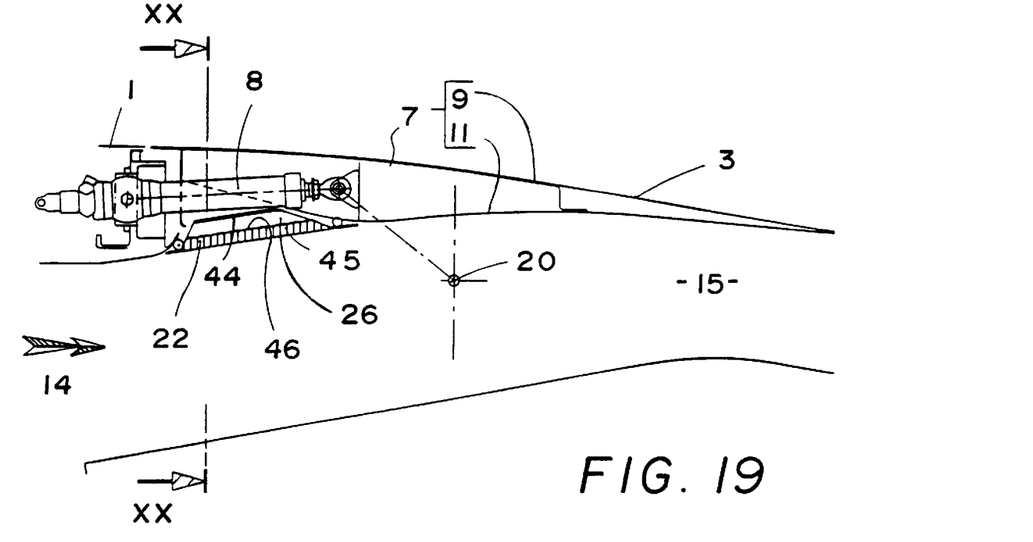
FIG. 19 is a partial, longitudinal, cross-sectional view of the thrust reverser according to the present invention illustrating an alternative construction for the panel.
Figure 20:
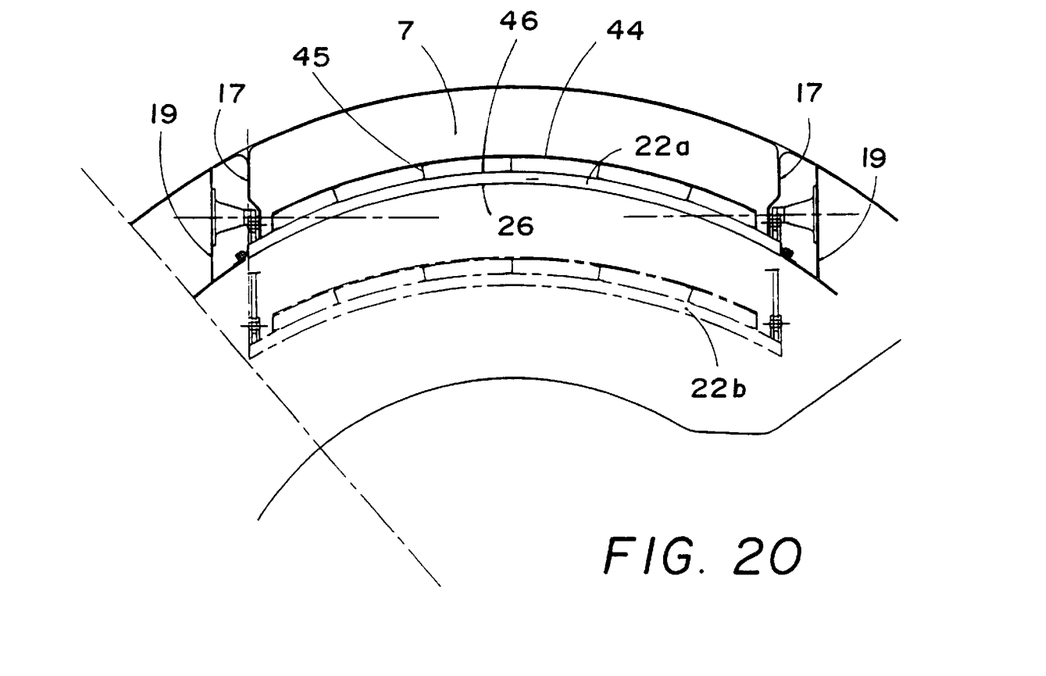
FIG. 20 is a cross-sectional view taken along the line XX—XX in FIG. 19.

In all of the previously described embodiments, the movement of the panel 22 between its first and second positions was linked to the movement of the thrust reverser door 7 between its forward and reverse thrust positions. It is within the scope of the present invention to provide an actuator for the panel 22 that is completely separate from the thrust reverser door 7. As illustrated in FIGS. 13, 24 and 18, a panel actuator 40, which may be completely separate from thrust reverser door actuator 8, has one end attached to the cowling at 39 and an opposite attached to the panel 22 at pivot 41. In this particular instance, the panel actuator 40 comprises an actuating cylinder with an extendible and retractable piston rod. In this particular embodiment, the link rods 23 and 35 are pivotably attached to the cowling at 24 and 36, respectively. Again, in this embodiment, the panel 22 is moved forwardly as well as inwardly as it moves from its first position to its second position.

The actuators 40 may be located in the cowling portions 18 extending longitudinally between adjacent reverse thrust openings and actuator 40 may control more than one panel 22. The operation of the actuator 40 may be synchronized with the door actuator 8, or it may be operated entirely independently of the door actuator 8. If the actuator 40 is entirely independent of the door actuator 8, the panel 22 may be displaced during any phase of the reverse thrust operation and may meet optimal requirements as a function of the desired performance. Because of the kinematics of the present invention, the displacement of panel 22 may be easily controlled and adjusted. In a cowling having a plurality of thrust reversers, some of the panels may not be moved during the reverse thrust operation from their first positions, or the positions of various panels of a particular cowling may be positioned differently from each other so as to provide directional control to the reverse thrust gas flow.

Figure 14:
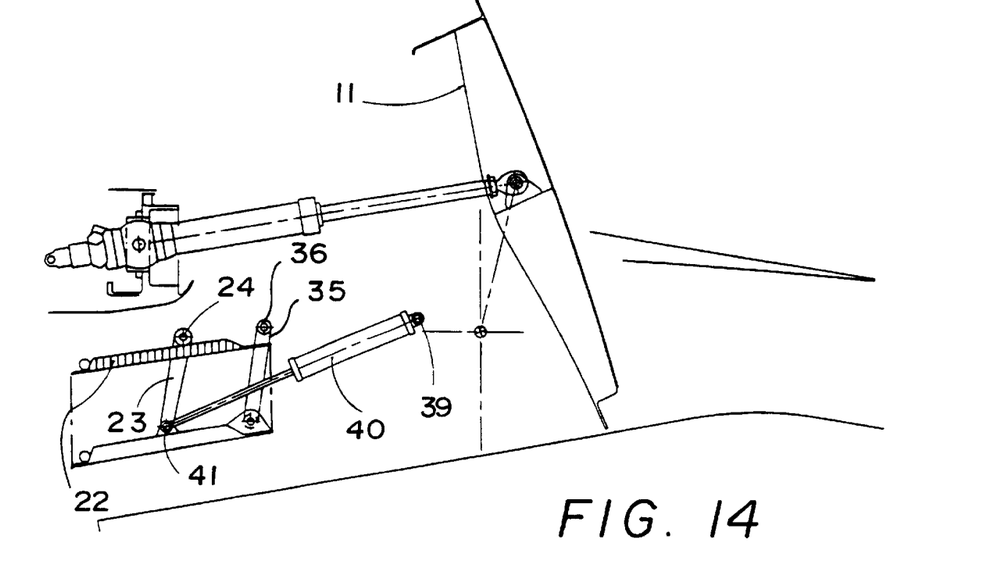

Variations of the embodiment illustrated in FIGS. 13, 14 and 18 may also be employed. In once such variation, the link rods 23 and 35 may be telescoping link rods, or may be replaced by actuators, similar to panel actuator 40. If the link rods 23 and 35 are replaced by individual actuators, panel actuator 40 may be completely eliminated.

Figure 15:
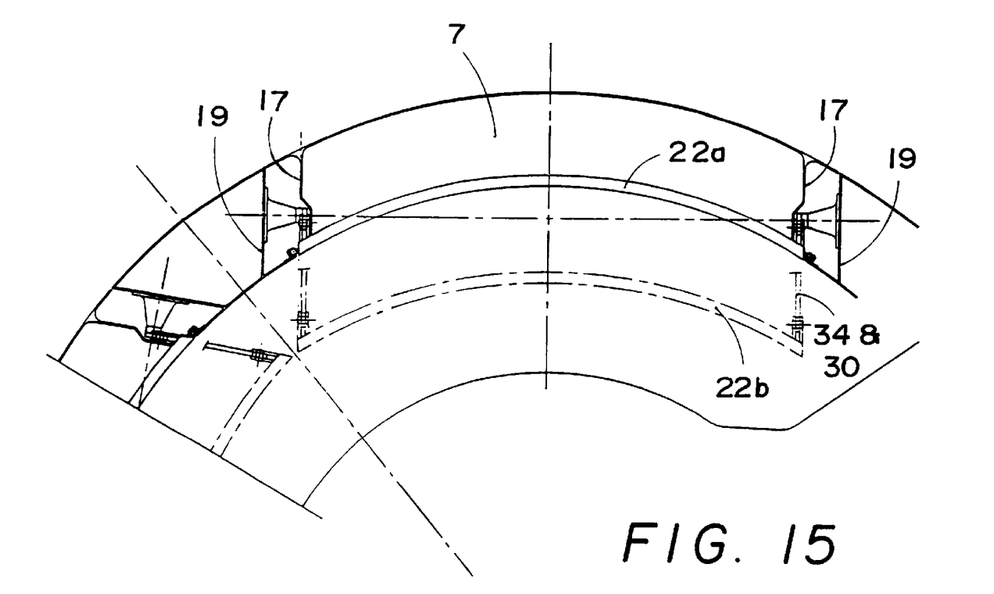
FIG. 15 is a partial, cross-sectional view taken in a direction of arrows XV—XV in FIG. 3.

In each of the aforedescribed embodiments, the described linkage mechanisms are utilized on each lateral side of the transversely arcuate panel 22. A typical installation for the embodiment illustrated in FIG. 3, is illustrated in the transverse cross-sectional view of FIG. 15. The solid lines 22a indicate the position of the panel 22 in its first position, while dashed lines 22b illustrate the second position of the panel. The linkages may be attached to the cowling at sidewalls 19 which form portions of the longitudinally extending portions 18 of the cowling 1. The pivot points of the attachment of the actuating mechanism to the cowling may result in pivot axes extending generally parallel to the door pivot axis 20.

Figure 16:
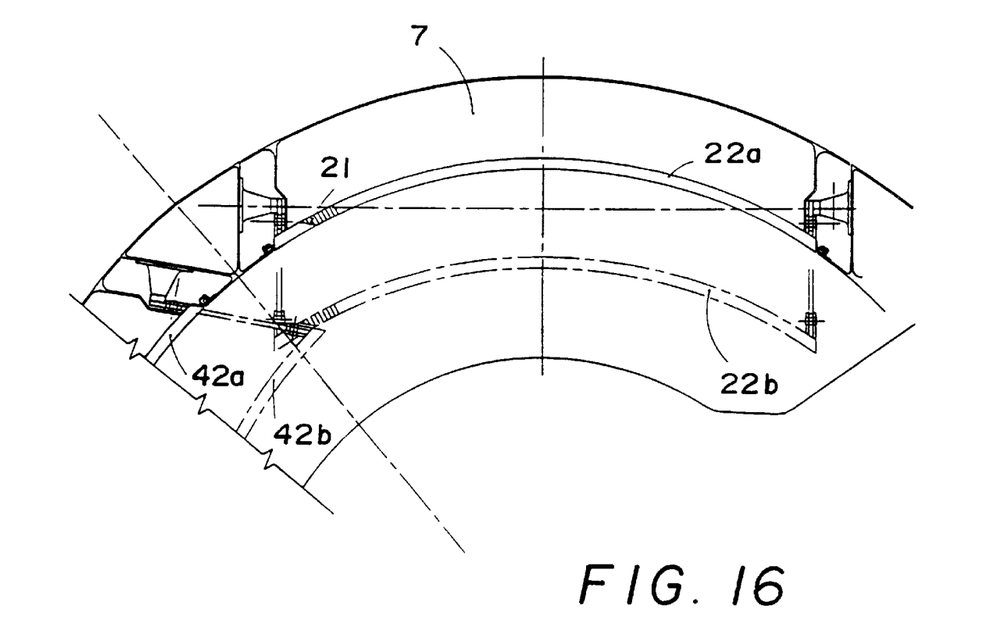
FIG. 16 is a view corresponding to FIG. 15, but illustrating an alternative panel structure to facilitate the movement of the panels.
Figure 17:
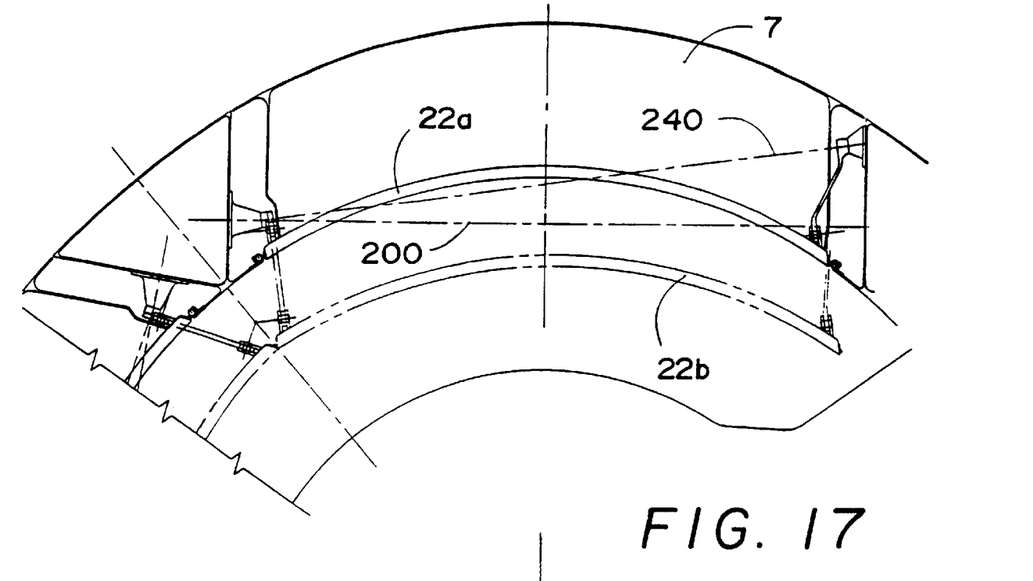
FIG. 17 is a view corresponding to FIG. 15, illustrating an alternative structure for panel movement.

A lateral portion of a panel 22 may have a cut out 21 as illustrated in FIG. 16 such that circumferentially adjacent panels 22 and 42 may be simultaneously moved between their first and second positions as illustrated FIG. 16. Again, the second positions of the panels are indicated at 22b and 42b, respectively.

In the embodiment illustrated in FIG. 27, the pivot axis of the actuating mechanism is oblique with respect to the door pivot axis. The actuating linkage pivot axis 240 passes through the pivot points 24 on opposite lateral sides of the panel and is skewed with respect to the door pivot axis 200.

In any of the aforedescribed embodiments, the door panel 22 may have an outer surface 46 facing away from the inner surface 26 and a wall 44 spaced from the outer surface 46. Wall 44 is spaced from the outer surface 46 by one or more longitudinally extending supports 45. This structure allows the optimization between aerodynamic design, structural strength, aerodynamic performance and controlling the flow of the reverse thrust gases. Walls 44 extend generally in the longitudinal direction of the engine axis and may or may not be parallel to the outer surface 46 of the panel 22. Walls 44 may be aerodynamically contoured to impart a desired flow direction to the gases when in the door is in the reverse thrust mode. Supports 45 may also be parallel to the longitudinal direction of the engine axis, or may be skewed with respect to such axis. Again, the contours of the supports 45 may be utilized to achieve the desired affect of the reverse thrust gas flow. Walls 44 and supports 45 may vary in the shape, height and/or width from one panel 22 to the next panel 22, or may even vary along an individual panel. Wall 44 may cover all or only a portion of the outer surface 46.

As a variation, the wall 44 may also have on its outer surface one or more supports 45 mounting one or more walls similar to wall 44. The use of such additional walls is limited only by the available space, the structural considerations of the panel and the desired reverse thrust gas flows.

The foregoing description is provided for illustrative purposes only and should not be construed as in any way limited this invention, the scope of which is defined solely by the appended claims.

We claim:

1. A thrust reverser for a turbojet engine having a cowling forming an outer boundary for a gas flow duct through which gases flow from a front to a rear, the cowling having at least one reverse thrust opening communicating with the gas flow duct, the thrust reverser comprising:
   a) a thrust reverser door pivotally attached to the cowling so as to move between a forward thrust position, wherein the thrust reverser door covers the at least one reverse thrust opening, and a reverse thrust position, wherein the thrust reverser door directs at least a portion of the gas flow through the at least one reverse thrust opening;
   b) a panel movable between a first position, wherein an inner surface of the panel forms a portion of the outer boundary of the gas flow duct, and a second position wherein the entire panel is located within the gas flow duct; and,
   c) an actuating mechanism connected to the panel to move the panel between the first and second positions wherein the panel undergoes generally translational movement.

2. The thrust reverser of claim 1 wherein the panel is substantially parallel to the direction of the gas flow through the duct when moving between the first and second positions.

3. The thrust reverser of claim 1 wherein the actuating mechanism comprises a plurality of link rods connected to the panel, the cowling and the thrust reverser door, such that movement of the thrust reverser door from the forward thrust position to the reverse thrust position causes movement of the panel from the first position to the second position.

4. The thrust reverser of claim 3 wherein the plurality of link rods comprises:
   a) a first link rod pivotally connected to the panel and pivotally connected to the cowling and a first pivot point; and,
   b) a second link rod pivotally connected to the panel and pivotally connected to the cowling at a second pivot pit spaced from the first pivot point.

5. The thrust reverser of claim 4 wherein the at least one reverse thrust (opening has a front edge, and the thrust reverser door pivots about a door pivot axis between the forward and reverse thrust positions, wherein the first and second pivot points are located between the front edge and the door pivot axis.

6. The thrust reverser of claim 4 wherein the actuating mechanism further comprises a third link rod pivotally connected to the first link rod and connected to the thrust reverser door.

7. The thrust reverser of claim 6 wherein the first pivot point is located between the connection of the first link rod and the panel, and the connection of the first and third link rods.

8. The trust reverser of claim 4 wherein the actuating mechanism further comprises:
   a) an elongated slot formed in the first link rod; and,
   b) a pin extending from the thrust reverser door and slidably engaging the elongated slot.

9. The thrust reverser of claim 8 wherein the first pivot point is located between the connection of the first link rod and the panel, and the elongated slot.

10. The thrust reverser of claim 4 wherein the actuating mechanism further comprises:
    a) a first sector gear on the first link rod; and,
    b) a second sector gear engaging the first sector gear and connected to the thrust reverser door.

11. The thrust reverser of claim 3 wherein the plurality of link rods comprises:
    a) a first link rod pivotally connected to the panel and pivotally connected to the cowling;
    b) a second link rod pivotably connected to the panel and to the thrust reverser door; and,
    c) a third link rod pivotally connected to the thrust reverser door and to the first link rod.

12. The thrust reverser of claim 1 wherein the actuating mechanism comprises:
    a) first and second link rods each pivotally connected to the cowling and to the panel; and,
    b) a panel actuator connected to the cowling and to the panel.

13. The thrust reverser of claim 12 further comprising a door actuator connected to the cowling and to the door.

14. The thrust reverser of claim 1 wherein the actuating mechanism comprises a plurality of actuators, each actuator connected to the cowling and to the panel.

15. The thrust reverser of claim 1 where in the panel further comprises an outer surface facing away from the inner surface, and an outer wall on the panel spaced from the outer surface.

16. The thrust reverser of claim 15 further comprising a plurality of supports extending between the outer surface and the outer wall.

* * * * *

UNITED STATES PATENT AND TRADEMARK OFFICE
CERTIFICATE OF CORRECTION

PATENT NO. : 5,899,059

DATED : May 4, 1999

INVENTOR(S) : Gonidec et al.

It is certified that error appears in the above-indentified patent and that said Letters Patent is hereby corrected as shown below:

Column 4, line 1, change "24" to -- 14 --.

Column 6, line 23, change "24" to -- 14 --.

Column 7, line 9, change "27" to -- 17 --.

Signed and Sealed this

Fifteenth Day of August, 2000

Attest:

Q. TODD DICKINSON

*Attesting Officer*      *Director of Patents and Trademarks*